US010927841B2

(12) United States Patent
Banks et al.

(10) Patent No.: US 10,927,841 B2
(45) Date of Patent: Feb. 23, 2021

(54) FAN WITH REMOTE TEMPERATURE SENSOR AND MOUNTING ARRANGEMENT (71) Applicant: DELTA T, LLC, Lexington, KY (US)

(72) Inventors: David R. Banks, Lexington, KY (US); Richard A. Oleson, Lexington, KY (US)

(73) Assignee: DELTA T, LLC, Lexington, KY (US)

( * ) Notice: Subject to any disclaimer, the term of this patent is extended or adjusted under 35 U.S.C. 154(b) by 761 days.

(21) Appl. No.: 15/127,323

(22) PCT Filed: Mar. 17, 2015

(86) PCT No.: PCT/US2015/020998
§ 371 (c)(1),
(2) Date: Sep. 19, 2016

(87) PCT Pub. No.: WO2015/142871
PCT Pub. Date: Sep. 24, 2015

(65) Prior Publication Data
US 2017/0089348 A1 Mar. 30, 2017

Related U.S. Application Data (60) Provisional application No. 61/954,226, filed on Mar. 17, 2014, provisional application No. 61/969,994, filed on Mar. 25, 2014.

(51) Int. Cl.
F24F 13/08 (2006.01)
F04D 27/00 (2006.01)
F24F 11/30 (2018.01)
F24F 11/77 (2018.01)
F04D 25/08 (2006.01)
F24F 110/10 (2018.01)

(52) U.S. Cl.
CPC ......... F04D 27/004 (2013.01); F04D 25/088 (2013.01); F04D 27/001 (2013.01); F24F 11/30 (2018.01); F24F 11/77 (2018.01); F05D 2270/303 (2013.01); F05D 2270/804 (2013.01); F24F 2110/10 (2018.01)

(58) Field of Classification Search
CPC ...... F04D 27/004; F24F 11/77; F24F 2110/10
USPC ................................. 454/247, 258
See application file for complete search history.

(56) References Cited

U.S. PATENT DOCUMENTS 4,671,458 A * 6/1987 Fukuda ............... F24F 11/0009
165/237
4,697,430 A 10/1987 Toyoda et al.
(Continued)

FOREIGN PATENT DOCUMENTS

CN 102759177 10/2012
JP 2004307011 A 11/2004
(Continued)

Primary Examiner — Helena Kosanovic
(74) Attorney, Agent, or Firm — King & Schickli, PLLC (57) ABSTRACT A fan includes a temperature sensor, such as a passive infrared sensor, for sensing temperature at a location remote from the fan, such as at a floor, ceiling, or wall, or simply external to the fan housing. This may avoid the influence of heat generated from components of the fan, such as the fan motor or controller for controlling the operation of the fan. A mounting arrangement for forming a connection between two parts, such as components of a fan, is also described.

6 Claims, 10 Drawing Sheets (56) References Cited

U.S. PATENT DOCUMENTS

| | | | | |
|---|---|---|---|---|
| 4,782,722 A | * | 11/1988 | Powell | B62M 11/145 |
| | | | | 475/213 |
| 5,627,527 A | * | 5/1997 | Mehta | F04D 25/088 |
| | | | | 340/12.5 |
| 5,996,898 A | | 12/1999 | Parker et al. | |
| 8,560,128 B2 | * | 10/2013 | Ruff | G05D 23/1902 |
| | | | | 700/278 |
| 8,900,041 B2 | | 12/2014 | Toy | |
| 9,092,039 B2 | * | 7/2015 | Fadell | F24F 11/30 |
| 9,234,668 B2 | | 1/2016 | Fadell et al. | |
| 9,890,970 B2 | * | 2/2018 | Bruck | F24F 11/30 |
| 2010/0291858 A1 | | 11/2010 | Toy | |
| 2013/0173064 A1 | | 7/2013 | Fadell et al. | |
| 2015/0133043 A1 | * | 5/2015 | Patel | F24F 11/0001 |
| | | | | 454/258 |

FOREIGN PATENT DOCUMENTS

| | | |
|---|---|---|
| JP | 4204892 B2 | 1/2009 |
| JP | 2011149300 | 8/2011 |
| WO | WO2009111708 | 9/2009 |

* cited by examiner

FAN WITH REMOTE TEMPERATURE SENSOR AND MOUNTING ARRANGEMENT

This application claims the benefit of U.S. Provisional Patent Application Ser. Nos. 61/954,226 and 61/969,994, the disclosures of which are incorporated herein by reference.

TECHNICAL FIELD

This application relates generally to the air handling arts and, more particularly, to a fan with a remote temperature sensor, as well as to a mounting arrangement, such as for a fan.

BACKGROUND OF THE INVENTION

Fans often incorporate temperature sensors to provide a measure of ambient temperature in order to regulate the operation of the fan. A downside of including the temperature sensor on the fan or within an associated housing is that the readings may be skewed by the actual temperature of the fan motor, such as due to heat resulting from the consumption of power, or because of the location (such as along a ceiling, in the case of an overhead fan). It may also be desirable in some instances for the temperature reading to be taken at a location that is remote from the fan, which an onboard sensor for sensing local temperature would be unable to do.

Fans also often include a modular component that may need to be installed and removed at some point during the service life. An example is a cover applied to a housing for the fan motor. Such components may be secured together by fasteners requiring tools to install or remove. It can sometimes be difficult to install or remove the fasteners, especially when the fan is mounted overhead on a ceiling.

Accordingly, a need is identified for solutions that may address any or all of the foregoing limitations, as well as others that may have yet to be identified.

SUMMARY

According to one aspect of the disclosure, an apparatus comprises a fan including a temperature sensor for sensing temperature at a location remote from the fan. The temperature sensor may comprise a passive infrared sensor, and may also include a temperature sensor for sensing a local temperature at the fan. The fan may comprise an overhead fan with a housing, and the temperature sensor may be positioned at least partially within the housing of the overhead fan.

The fan may include a cover, and the temperature sensor may receive energy through the cover. The sensor may comprise a body at least partially projecting through the cover. A controller may also be provided for controlling the fan based on the temperature at the remote location. The controller is adapted to activate the fan, de-activate the fan, reverse the direction of the fan, or regulate the speed of the fan, based on the remote temperature.

Another aspect of the invention pertains to an apparatus for moving air within a space. The apparatus comprises a fan including a plurality of blades for moving the air within the space, and a temperature sensor for sensing temperature by receiving energy from a location external to the fan. In one embodiment, the temperature sensor comprises a passive infrared sensor.

The fan may comprise a cover, and the energy may be received through the cover to detect a temperature thereof as representative of the temperature external to the fan. The fan may further comprise a heat-generating element, such as a motor or electric circuit board, and the cover is spaced therefrom. The temperature sensor may be adapted for detecting a first temperature of an object in the space and a second temperature of the cover. The temperature sensor may comprise a first temperature sensor for detecting a first temperature of an object in the space and a second temperature sensor for detecting a second temperature of the cover. The temperature sensor may project at least partially through the cover.

A further aspect of the disclosure pertains to an apparatus for moving air within a space, which comprises a fan including a plurality of blades for moving the air within the space, a motor for causing the blades to rotate, and a controller for controlling the fan. A temperature sensor for indirectly sensing temperature at a location external to the fan without the influence of any heat generated by the motor or the controller is also provided.

Still a further aspect of the disclosure pertains to a method for detecting temperature for use in regulating the operation of a fan. The method comprises using a non-contact sensor to receive energy from a structure in contact with an ambient environment external to the fan to determine a temperature at the location, and regulating the operation of the fan based on the sensed temperature. The sensing step may comprise receiving the energy within a housing on the fan through a cover. The cover may comprise the structure.

Yet a further aspect of the disclosure pertains to a method for detecting temperature for use in regulating the operation of a fan. The method comprises sensing a temperature of an object at a location remote from the fan, and regulating the operation of the fan using the sensed temperature. The object may comprise a ceiling, a wall, or a floor, and the sensing step comprises receiving energy from the object.

Still another aspect of the disclosure pertains to an apparatus for forming a connection. The apparatus comprises a first part including a first radially extending projection, and a second part including a receiver for receiving the radially extending projection of the first part when rotated to move along a circumferential path. The second part further includes a second radially extending projection for preventing the first projection from entering the receiver without radial deformation of one or both of the first and second projections.

In one embodiment, the first projection includes a first end associated with a first diameter of the first part, and the second projection includes a second end having a second diameter that is less than the first diameter of the first end. The second projection may associate with a reinforcement for controlling the amount of radial deformation created by the engagement with the first projection. The first and second parts may be generally cylindrical, and the first part may be nested at least partially within the second part. The receiver may include an axially extending opening in the form of a slot terminating in a support surface for supporting the first projection prior to the engagement with the second projection. In one particular embodiment, the first part comprises a first fan component and the second part comprises a second fan component.

DETAILED DESCRIPTION

Figure 1:
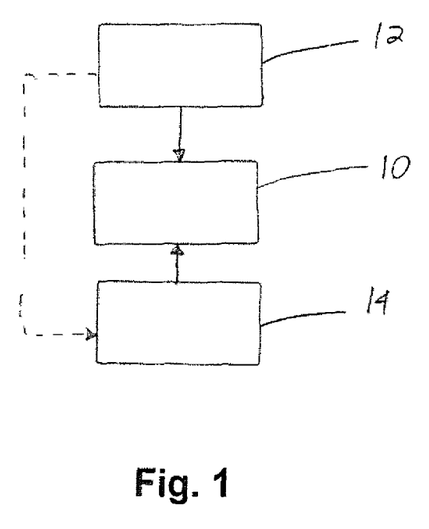
FIG. 1 is a schematic view illustrating the overall architecture of a fan according to one aspect of the present disclosure.

Reference is now made to FIG. 1, which schematically illustrates one possible embodiment of a fan 10 according to the present disclosure. The fan 10 includes at least one non-contact temperature sensor 12, such as one using invisible (e.g., infrared) energy, to detect temperature at a location remote from the fan itself (i.e., not at the location where the fan is positioned). The sensed temperature may then be used by a controller 14 to control the operation of the fan 10, such as by activating it, deactivating it, or otherwise regulating its speed of operation.

In one particular embodiment, as shown in FIGS. 2-5, the fan 10 comprises a ceiling fan 100, such as one adapted for mounting to a ceiling or other overhead location, but the disclosure may be applicable to other types of fans as well, such as for example pedestal fans. The ceiling fan 100 includes a plurality of blades B, such as three in the illustrated example, but any number of blades may be provided. The blades B are attached to and extend generally radially from a hub H, and may be equidistantly or irregularly spaced. The hub H, in turn, is connected to a support S for supporting the fan 100 from a stable support structure, such as the ground, a wall, or the ceiling of a room, and in a manner that permits rotation of the blades B about an axis X in order to generate airflow.

Figure 2:
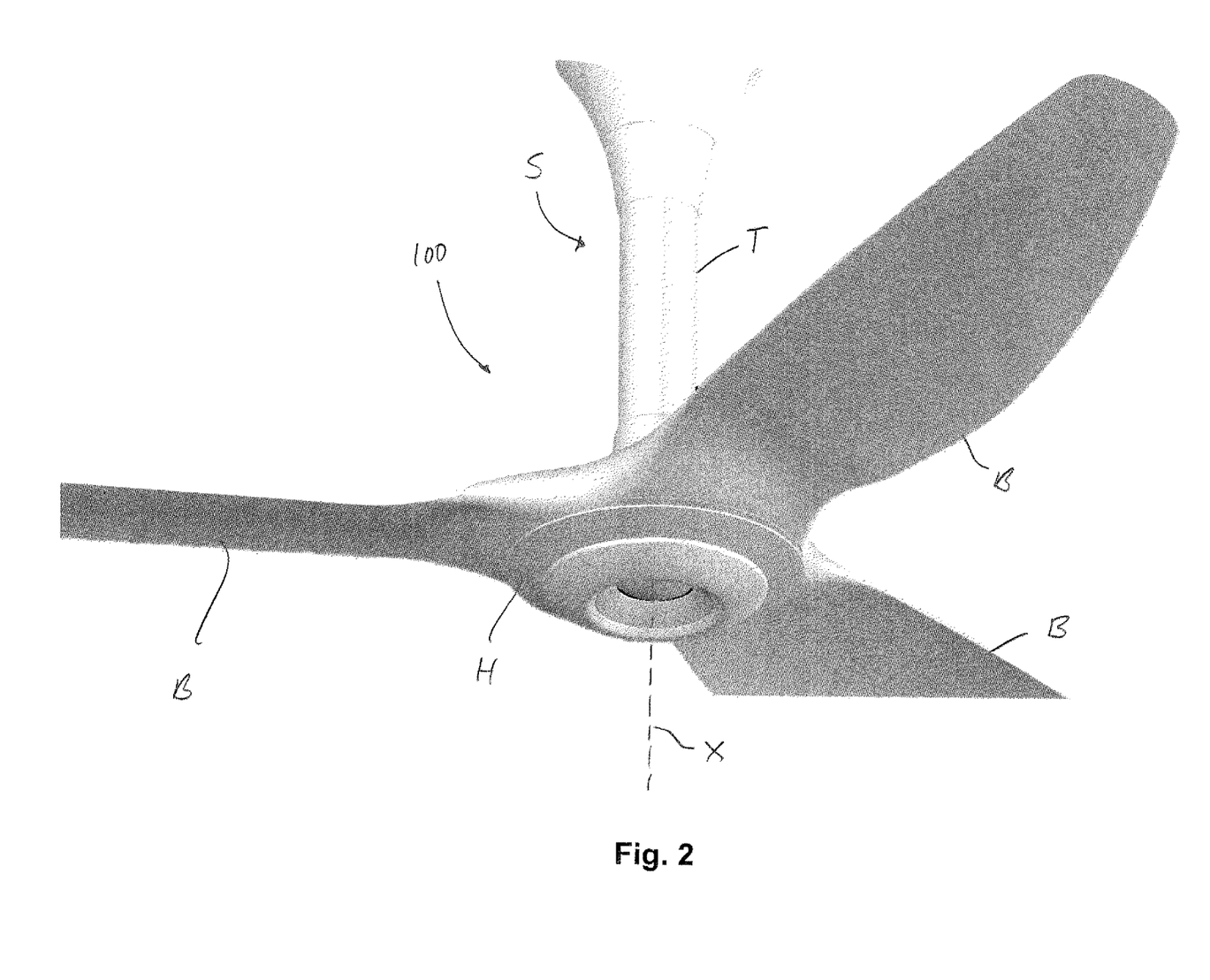
FIG. 2 is a partially cutaway perspective view of an exemplary fan.

The fan 100 may be associated with a motive device, such as an electric motor (not shown) in order to impart rotary motion to the blades B. The motor may be contained within the mounting tube T forming part of the support S. Additional details may be found in U.S. Patent Application Publication No. 2011-0165002, the disclosure of which is incorporated herein by reference.

Figures 3, 3A:
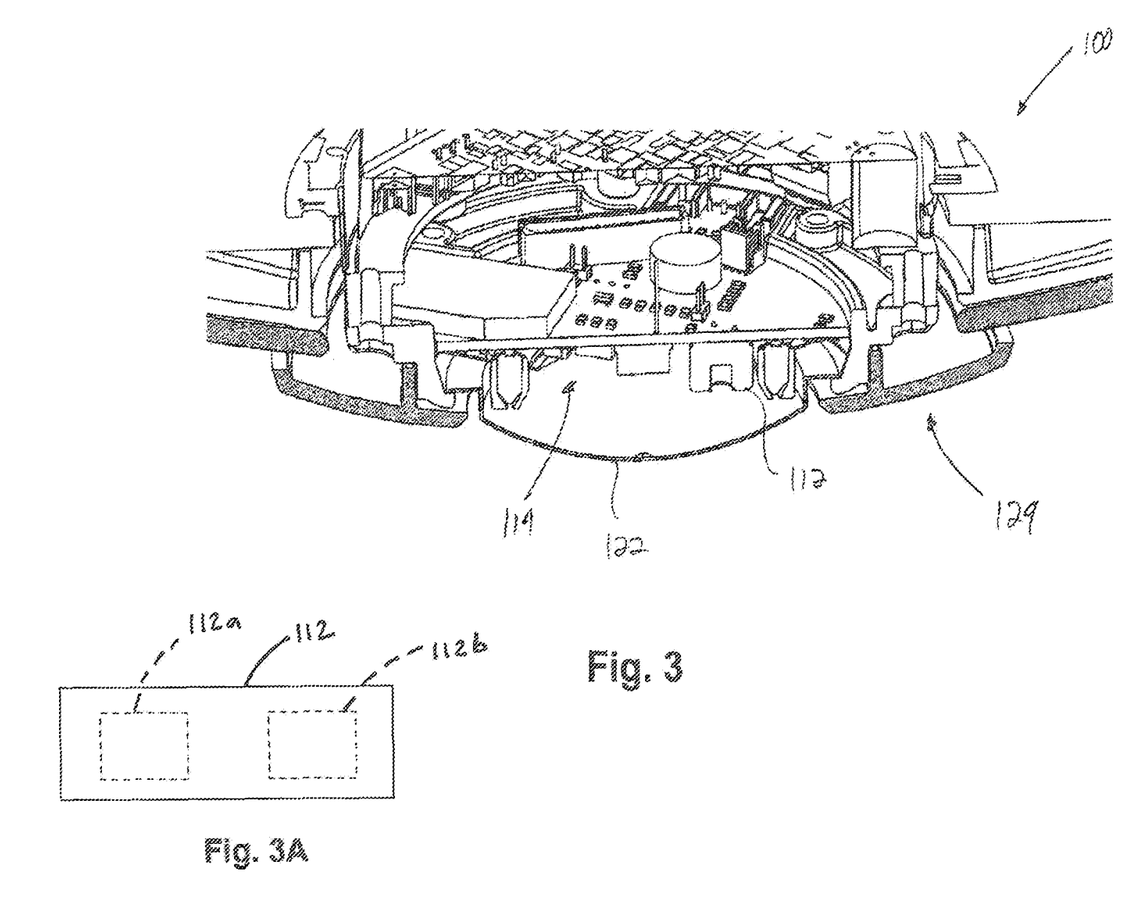
FIGS. 3-5 are partially cutaway, partially cross-sectional views of a part of the fan according to several different embodiments.
Figure 4:
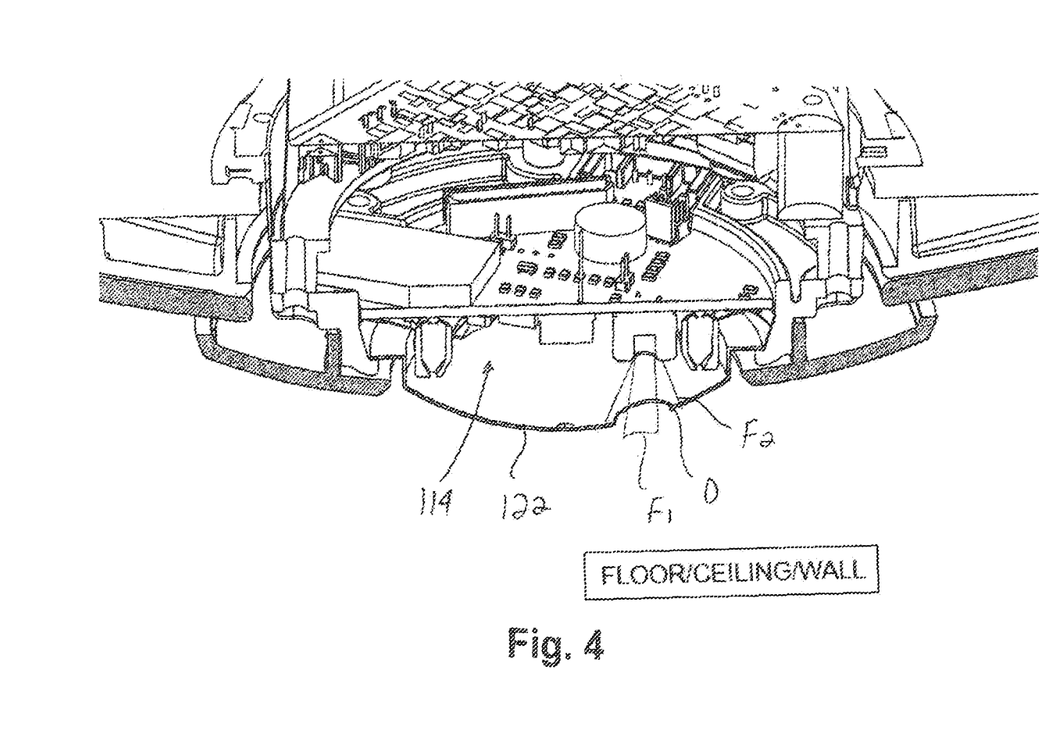

As indicated in FIG. 3, the fan 100 includes a controller 114, which may form part of a printed circuit board. This board serving as the controller 114 may support the remote temperature sensor 112. The board may also include various other electronic devices or components. For example, the board may include a light sensor, an occupancy sensor, a local temperature sensor (which may also detect relative humidity), a wireless radio or the like.

One or more of the sensors may detect or receive energy (such as infrared energy) from a location external to the fan 100 in order to perform a sensing function. For example, the energy may be transmitted from an object in an associated space in the case of the remote temperature sensor 112, which may be associated with a pyroelectric sensor (which may form part of a single sensor package serving as a passive infrared, or PIR, sensor). The object may be a wall, ceiling, floor, or any other structure within the space that may be representative of ambient temperature.

In this or another embodiment, a cover 122, such as a thin membrane, may also be provided for allowing the energy to pass to sensor 112 from a location external to the fan 100. This cover 122 may be connected to and form part of the external housing 124 of the fan 100, which housing may also interface with the hub H and the associated blades 13 to cause air movement.

In one embodiment, this cover 122 is spaced apart from the heat-generating structures in the fan 100, such as the fan motor and control circuitry (e.g., controller 114), and has an outer surface exposed to the ambient air. The material of the cover 122 may be selected so as to be emissive within the particular wavelength of the beam (e.g., 8-14 microns in the case of an infrared thermometer). Hence, the sensor 112 may detect the temperature of the cover 122 as a remote location (that is, remote from the heat-generating structures of the fan 100) as being representative of the ambient air temperature.

As can be appreciated, it may also be possible to combine the features of the above-referenced embodiments. For instance, the sensor 112 may be used to read both a remote temperature of an object in the room, as well as the temperature of the cover 122. This may be achieved by providing two separate sensors as part of the sensor 112 (one, such as sensor 112a in FIG. 3A for detecting the object in the space (such as a floor, ceiling, wall, etc.), and another, such as sensor 112b for detecting the cover 122), or by using a single sensor 112 that may alternately view the cover 122 or an object (see FIG. 4, and note fields F1, F2, the former associated with an opening O in the cover 122 and the latter associated with the cover 122 itself). The different readings may then be used to determine a temperature difference indicative of the degree of temperature stratification between, for example, the floor and the ceiling, and the operation of the fan 100 may be regulated accordingly (e.g., the speed increased until the difference is reduced or eliminated).

Figure 5:
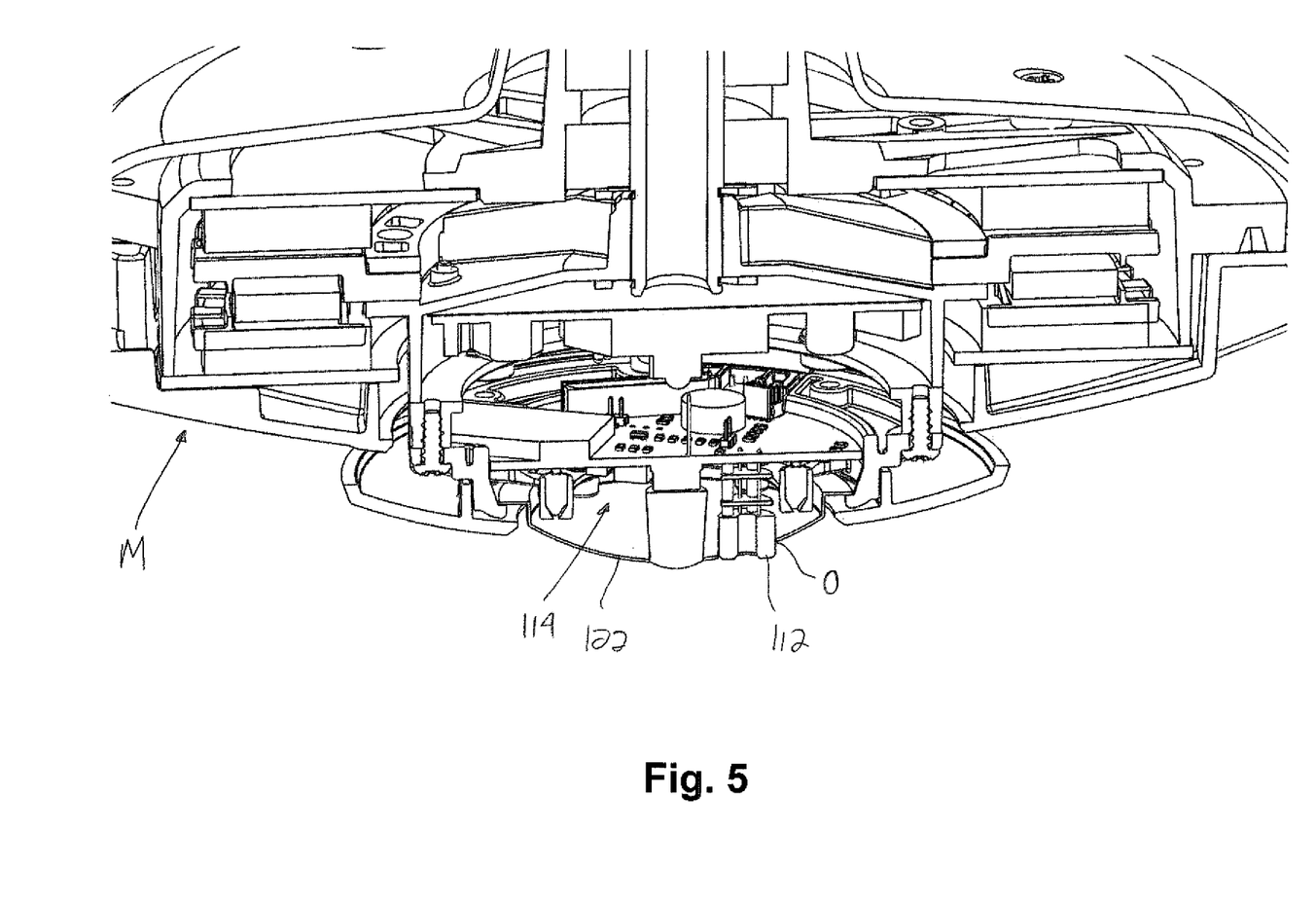
Figure 6:
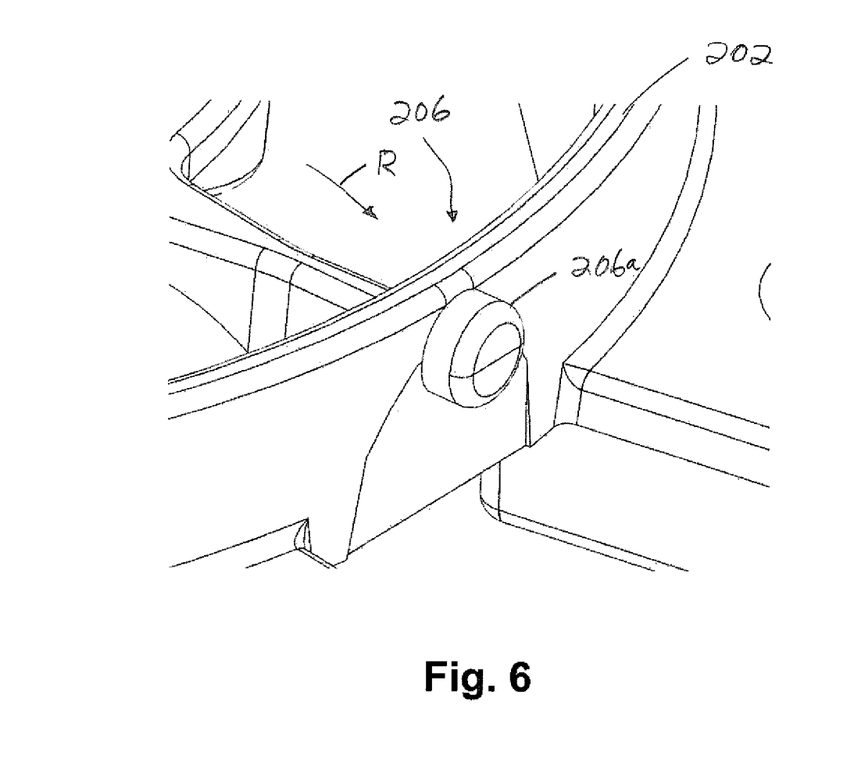
FIGS. 6-10 are various views of a mounting arrangement, which may be used in connection with a fan.

FIG. 5 illustrates a further embodiment where the temperature sensor 112 may be at least partially external to the housing 124 of the fan 100. For instance, the sensor 112 may extend or project through the cover 122 (which extension or projection in all embodiments may be in any direction by reorienting the sensor 112 accordingly). Thus, the influence of the motor M and controller 114 on the temperature reading is avoided.

In any case, the operation of the fan 100 may be regulated by controller 114 (including specifically a motor controller) based on the output of the remote temperature sensor 112. Specifically, the fan 100 may be actuated based upon the sensing of a remote temperature at a pre-determined level, or may be de-activated once actuated (including by a user, and not necessarily as the result of an automated event) once a remotely sensed temperature reaches a pre-determined level (which may be set by way of a remote device, such as a thermostat or computer). Aside from or in addition to activation and de-activation, it is also possible to regulate the speed of the fan 100 based on the sensed temperature, such as based on a pre-determined or user-inputted set point value (which, again, may be provided by way of a remote device). It is also possible to reverse the direction of the fan 100.

The remote temperature sensor 112 may also be used as an alternative when it is determined that the local temperature sensor is subject to overheating. This may be based upon whether the fan 100 is or has been running, including for a specific period of time, with the assumption that the fan will have generated heat making the local temperature measurement unreliable.

Another aspect of the disclosure pertains to a manner of releasably connecting two generally cylindrical components together, such as for example mounting component parts of a fan (e.g., for mounting together different parts of a fan housing, such as a base and a cover, which may form part of an overhead or ceiling fan). However, the disclosure is not limited to any particular mode or environment of use. With reference to FIG. 6-10, this may be achieved in one embodiment by providing an apparatus 200 in the nature of a bayonet fitting for establishing a connection between a first, inner component 202 and a second, outer component 204 that, as a result of the connection, are mounted together.

Figure 8:
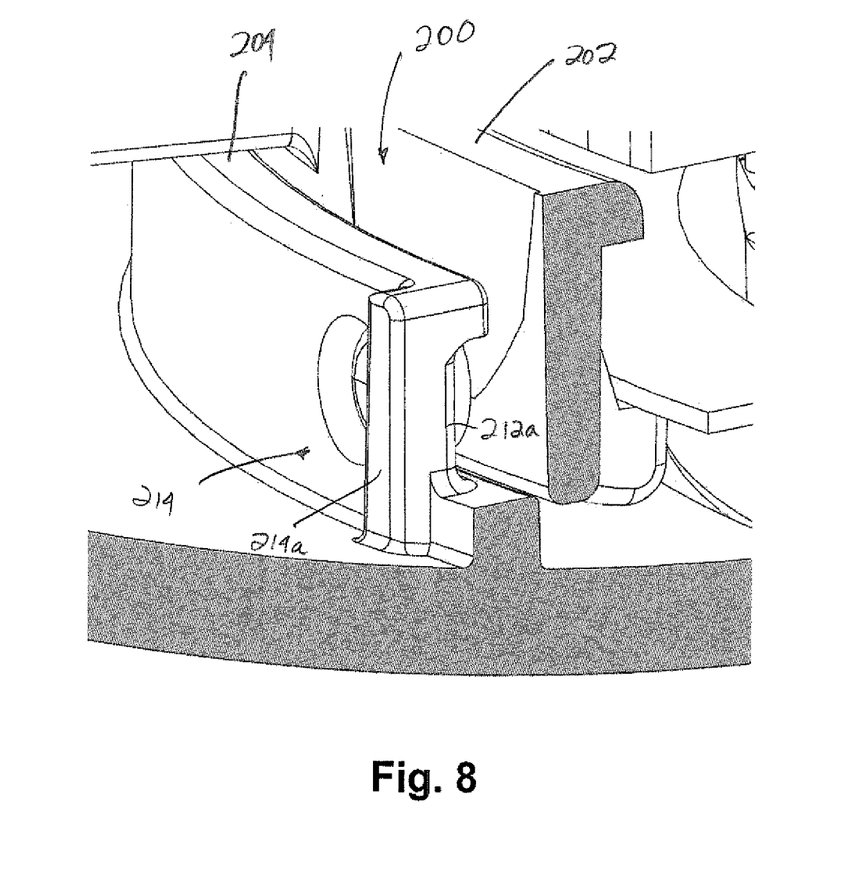

As perhaps best understood from FIG. 8, the components 202, 204 may be nested such that at least one component is partially within the other. In the illustrated embodiment, the diameters of the components 202, 204 are such that the inner component 202 at least partially nests within the outer component 204. In this situation, and as perhaps best understood in FIG. 6, one or more locking elements 206, such as pins 206a (only one shown), extend from the first or inner component 202, at a height (in the radial direction R) such that the resulting diameter circumscribing the top of the locking element is greater than the inner diameter of the outer component 204.

Figure 7:
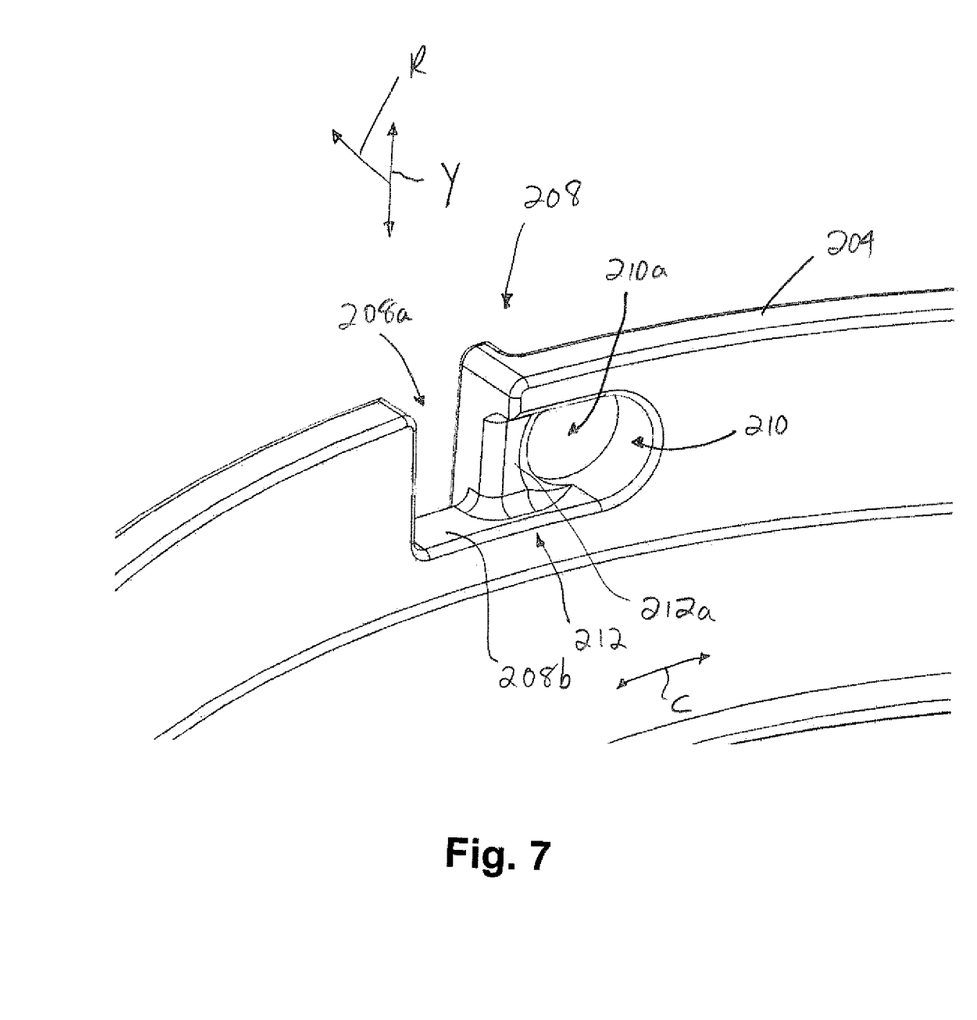

Corresponding to the each locking element 206 is a receiver 208 formed in the outer component 204, which as shown in FIG. 7 may comprise a slot 208a extending axially (arrow Y, which may be parallel to axis X in FIG. 2). The slot 208a is adapted for receiving the pins 206a when the components 202, 204 are nested together. A support surface 208b is provided for engaging the locking pin 206a once the slot 208a is traversed, such as when the components 202, 204 are rotated relative to each other in the circumferential direction.

The interior surface of the outer component 204 includes a recess 210, which extends laterally from the axial slot 208a. One end of this recess 210 includes a region (which in the illustrated embodiment is a through hole 210a) having a depth such that the end of locking pin 206a may be received in it. Thus, the region 210a has a diameter at least as great as the diameter of the locking pin 206a.

Between the slot 208a and this region 210 is a radially inward projection 212. This projection 212 forms a shallower region 212a, as compared to region 210. Specifically, the shallower region 212a may have a diameter that is greater than the diameter of the projection or pin 206a, and thus serves as a detent.

As can be appreciated, in order for the pin 206a to pass from the slot 208a into the region 210 in the circumferential direction (arrow C), some measure of radial deformation is required in view of the presence of the projection 212. This deformation may be on the part of the pin 206a, the associated part of the component 202, the projection forming the shallower region 212a, or any combination of these elements. Once the deformation is removed, the projection 212 returns to the home position and thus captures the pin 206a in the recess 210.

Figure 9:
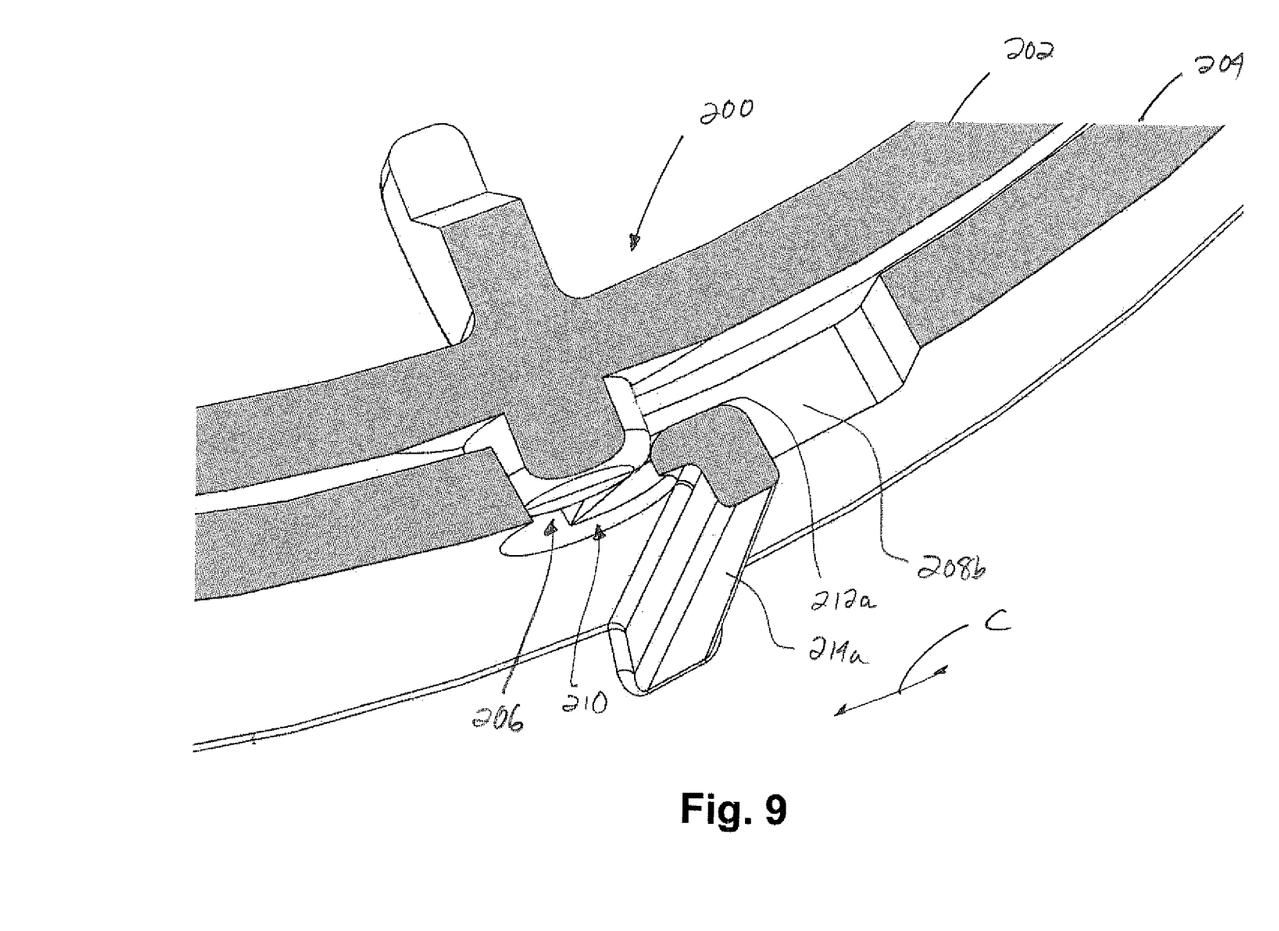
Figure 10:
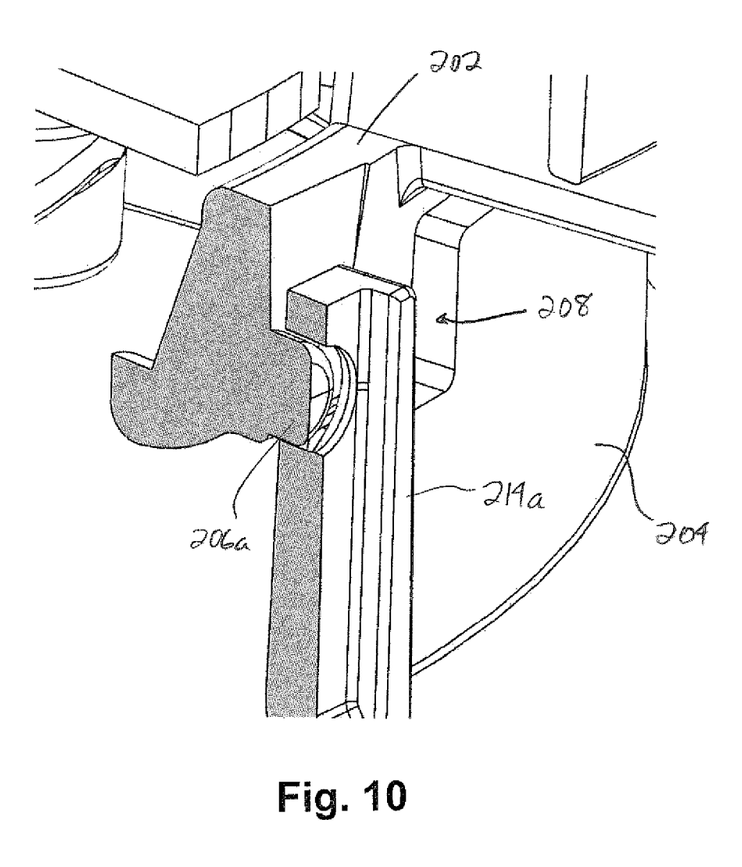

Turning to FIGS. 8-10, it can be understood that the portion of the component 204 including the projection 212 may be provided with a reinforcement 214, such as an elongated rib 214a, in order to help control the radial deformation of the associated projection. This not only provides reinforcement against radial loads created during the repositioning of the pin 206a from the slot 208a to the region 210a, but also in the axial direction X.

Having shown and described various embodiments, further adaptations of the apparatuses, methods and systems described herein may be accomplished by appropriate modifications by one of ordinary skill in the art without departing from the scope of the disclosure. Several of such potential modifications have been mentioned, and others will be apparent to those skilled in the art. For instance, the connection between the inner and outer components 202, 204 could be reversed, such that the projection 202 is on the outer component 204 and the receiver 208 is on the inner component 202. The examples, embodiments, geometries, materials, dimensions, ratios, steps, and the like discussed above are illustrative and are not required. Accordingly, the scope of the disclosure should be considered in terms of claims that may be presented, and is understood not to be limited to the details of structure and operation shown and described in the specification and drawings.

The invention claimed is:

1. An apparatus for moving air within a space, comprising:
   a fan including a plurality of blades for moving the air within the space; and
   at least one temperature sensor for sensing temperature at a location external to the fan;
   wherein the fan comprises a cover, and the at least one temperature sensor comprises a passive infrared sensor within the cover for receiving energy from the cover to detect a temperature wherein the temperature of the cover is the same temperature as the temperature external to the fan.

2. The apparatus of claim 1, wherein the fan comprises a heat-generating element, such as a motor or electric circuit board, and the cover is spaced therefrom.

3. The apparatus of claim 1, wherein the at least one temperature sensor comprises a first temperature sensor adapted for detecting a first temperature of an object in the space and, further including a second temperature sensor adapted for detecting a second temperature of the cover.

4. A method for detecting temperature for use in regulating the operation of a fan, comprising:
   via a passive infrared sensor, detecting a temperature of a structure in contact with an ambient environment external to the fan by receiving energy from or through a cover on the fan; and
   via a controller, regulating the operation of the fan based on the temperature of the structure
   sensing a temperature of the cover adjacent to the fan via the passive infrared sensor;
   comparing the temperature of the cover to the temperature of the structure to determine a temperature difference via the controller; and
   increasing a speed of the fan until the temperature difference is reduced or eliminated via the controller.

5. The method of claim 4, wherein the regulating step comprises regulating a speed of the fan based on the detected temperature of the structure relative to a pre-determined or user-inputted set point value via the controller.

6. The method of claim 4, wherein the regulating step comprises regulating the fan once the detected temperature of the structure reaches a pre-determined level set by a thermostat via the controller.

* * * * *